United States Patent [19]

Nadin et al.

[11] 4,342,345

[45] Aug. 3, 1982

[54] METHOD AND APPARATUS FOR FILLING BULK MATERIAL CONTAINERS

[75] Inventors: Robert P. Nadin, Wharton; Antonios Nicholakopoulos, Mercerville; Joseph P. Urban, Port Reading; Steven G. Markowski, East Brunswick, all of N.J.

[73] Assignee: Union Carbide Corporation, Danbury, Conn.

[21] Appl. No.: 214,586

[22] Filed: Dec. 9, 1980

[51] Int. Cl.³ ............................................. B65B 1/10
[52] U.S. Cl. ...................................... 141/392; 239/666
[58] Field of Search ............ 141/93, 94, 95, 285–310, 141/192–229, 129–191, 250–284, 392; 239/666; 193/3; 198/640, 641, 642; 214/17 CD

[56]  References Cited

U.S. PATENT DOCUMENTS 4,135,560  1/1979  Eang et al. ........................ 141/198

OTHER PUBLICATIONS

Flow-Tronics Publication, Dated Mar. 3, 1975, Allied Industries, Houston, Texas.

Primary Examiner—Houston S. Bell, Jr.
Attorney, Agent, or Firm—Clement J. Vicari; Robert C. Brown

[57] ABSTRACT

The disclosed invention relates to an improvement in apparatus for filling and distributing, in a container of varying configuration, bulk materials having inlet means positioned near the top of the container; and rotor means positioned below; the improvement comprising rotor means having upright vanes defining an unobstructed central area onto which the material is received by the rotor.

9 Claims, 3 Drawing Figures

METHOD AND APPARATUS FOR FILLING BULK MATERIAL CONTAINERS

The present invention relates to an apparatus for filling bulk material containers and, more particularly, to an apparatus for feeding and distributing material within said containers regardless of the configuration of the containers.

Heretofore, considerable effort has been directed to providing method and apparatus for the feeding and distribution of bulk materials within containers, but relatively little effort has been directed to such filling and distribution within containers having asymmetrical interiors. While it is relatively simple to fill, with good material distribution, the interior of a clear cylindrical or spherical material container, it is quite difficult to fill, with good material distribution, the interior of an internally-reinforced container or one having an asymmetrical interior shape.

Many modern bulk containers have asymmetrical interior shapes and internal reinforcing members which are occasioned by the modern requirements for storage, filling and intermodal containerized transportation.

According to U.S. Pat. No. 4,135,560 which issued on Jan. 23, 1979, there is provided an apparatus for feeding and distributing in a container of varying configuration bulk materials which includes material inlet means positioned near the top of the container; at least partially radially-compartmented rotor means horizontally positioned below the inlet means; and material-deflecting stator means fixedly positioned vertically around the periphery of the rotor means and mounted through means for permitting preselected orientation of the stator means with respect to the rotor means.

The present invention provides an improvement in the rotor means utilized in the above described apparatus which improvement provides better control, more uniform material distribution and commensurately higher loading than the prior art apparatus.

Therefore, the prime object of the present invention is to provide an improvement in apparatus for feeding and distributing bulk materials into containers.

Another object is to provide an improvement in apparatus for the efficient feeding and distribution of bulk materials into containers without regard to the internal symmetry of the containers.

Other aims, advantages and objects will be apparent from the following description and appended claims.

As employed herein, the term "container" means relatively large, rigid enclosures, bins or boxes (e.g. silos, hopper cars, van boxes and the like) having either symmetric or asymmetric configurations by shape or volume, relative to the point of filling of such container; and "bulk materials" means the wide range of particle size, shape and density of solid material which may extend from powders, granules, pellets, to small chunks.

In accordance with the present invention there is provided an improvement in the apparatus for feeding and distributing in a container of varying configuration bulk materials which includes inlet means including a discharge outlet positioned near the top of the container, and rotor means horizontally positioned below said inlet means, whereby said bulk materials are delivered from said inlet means through said discharge outlet into said rotor means the improvement wherein said rotor means includes a rotor having a substantially circular base member, a rotor shaft for providing movement to said rotor, said base member being detachably secured to said rotor shaft, and a system of upright vanes radially distributed on said base member, said vanes extending from the outer periphery of said base member inwardly towards said rotor shaft and terminating at a point at or prior to the periphery of said discharge outlet of said inlet means to define an unobstructed central area between said rotor shaft and the inward edge of said vanes.

In a preferred embodiment the unobstructed central area around said rotor is at least coextensive with the discharge area of the inlet feed means to the rotor. Moreover, the base member preferably includes a central hub which is detachably secured to the rotor shaft. In addition the rotor is provided with a cover plate disposed on the upper edges of the vanes characterized by an inner periphery substantially co-extensive with the inner vertical edges of the vanes to define an opening substantially co-extensive with the unobstructed central area in said rotor.

Figures 1, 3:
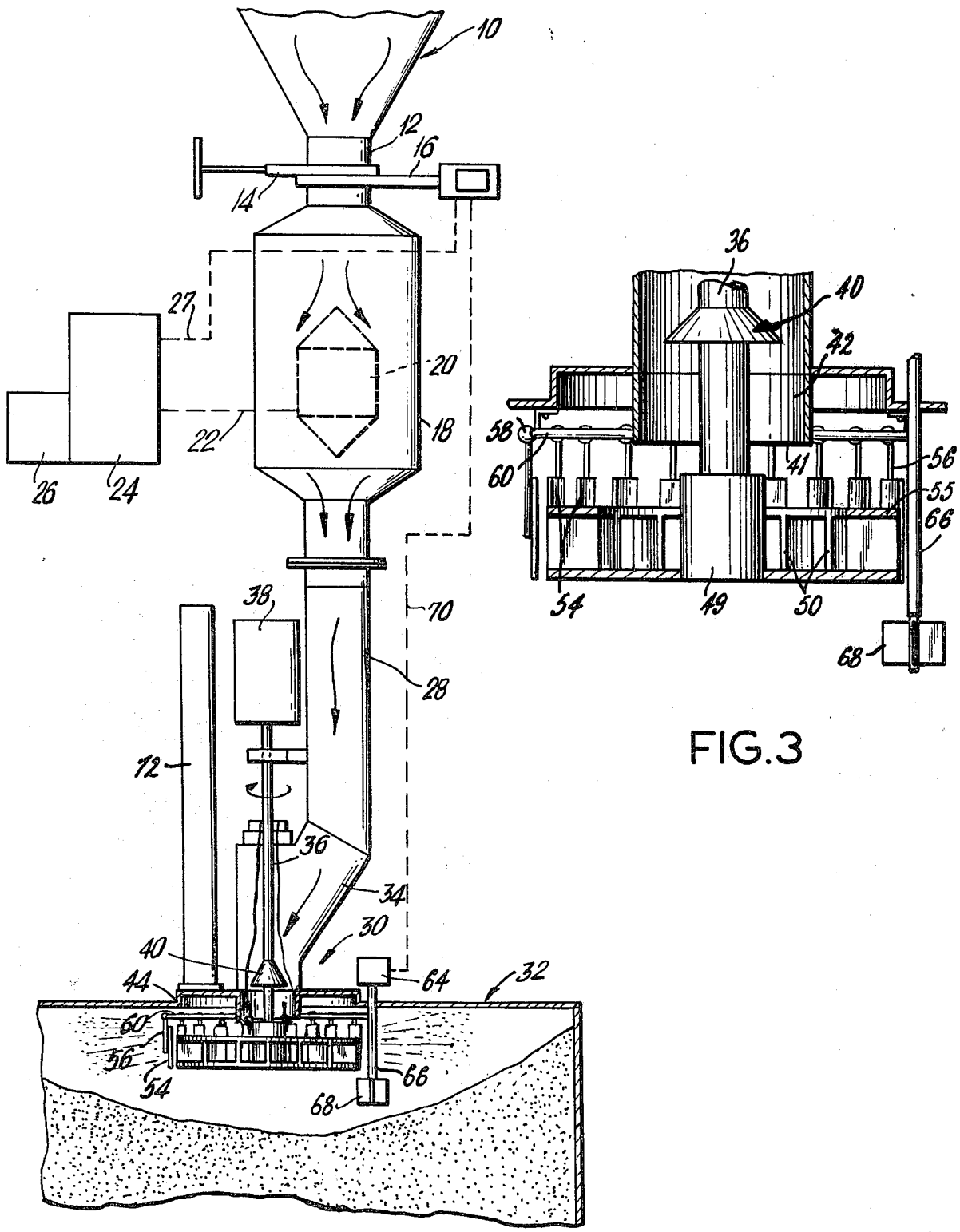
FIG. 1 is a schematic elevational view, portions thereof being in section, of a bulk material feeding and distribution system embodying the invention.
FIG. 3 is an elevational view, partially in section, showing the detailed construction of combined rotor means, material-deflecting stator means and sensor means employed in the present invention.

Referring specifically to the apparatus embodiments of the drawings, bulk material is conveyed in a stream by gravity from a surge bin 10 through conduit 12 containing valve means 14 and 16. Valve means 14 comprises a manual control valve and valve means 16 a pneumatic, actuated on-off valve.

From conduit 12, the bulk material stream passes through chamber 18 containing mass rate sensor 20 which is electrically connected through line 22 to preset batch counter, integrator and recorder 24 which is, in turn, connected to printer 26. An electrical feedback loop is established through line 27 from the integrator 24 to the control of pneumatic valve 16.

From chamber 18 the bulk material stream passes through gravity chute 28 to the material feeding and distribution assembly 30 which is positioned immediately above and within the top of container 32.

The feeding and distribution assembly 30 comprises an upper chamber 34 through which the bulk material stream passes. Also passing through chamber 34 is rotating shaft 36 driven by motor 38. Positioned on shaft 36 in the chamber 34 is an outwardly-flaring rotating cone 40. A stationary hopper 42 is positioned at the end of gravity chute 28 at approximately the top 44 of container 32. The bulk material stream, feeding under gravity through chute 28 into the system, first encounters a combination of rotating cone 40 and stationary hopper 42 at the end of the chute which is designed to reduce the vertical momentum of the material before feed into the next stages of the system. This combination is also designed to provide uniform feed of material in all azimuthal directions onto the rotor.

The above-described apparatus features are essentially those which are disclosed in U.S. Pat. No. 4,135,560. According to the present invention which is an improvement in the rotor means disclosed according to the prior patent, rotor means 46 of the instant invention is detachably secured to the lower end of shaft 36. Thus as best seen from FIG. 2 the rotor means 46 includes a horizontal base 48 which is adapted to be secured at its center to shaft 36 such as by provision of hub 49 which is secured to shaft 36. Other means of securement are possible such as a downwardly projecting element (not shown) to be secured to the rotor shaft 36 which would leave the entire surface area of the base 48 free from obstruction from rotor shaft 36 outwardly across the surface of base plate 48 until the edges 53 of the vanes. The horizontal base has a substantially circular configuration and is compartmented by a system of upright vanes 50 distributed on the surface of horizontal base 48. The vanes extend from the outer periphery 51 of base 48 inwardly toward hub 49 secured to rotor shaft 36 and terminates at a point at or prior to the periphery of discharge outlet 41 of hopper 42 to define an unobstructed central area 52 between hub 49 secured to rotor shaft 36 and the inward edges 53 of vanes 50. The number of vanes utilized can range from about 4 to about 12 preferably about eight, and depends among other things on the rotational speed of the rotor and the velocity with which the resin enters the unobstructed area.

The distance between the inward edges 53 of vanes 50 and the hub 49 secured to rotating shaft 36 can vary depending on the quantity of vanes distributed radially along base 48. In general, however, the vanes should extend about ⅓ the distance between the outer periphery 51 to the hub 49.

Figure 2:
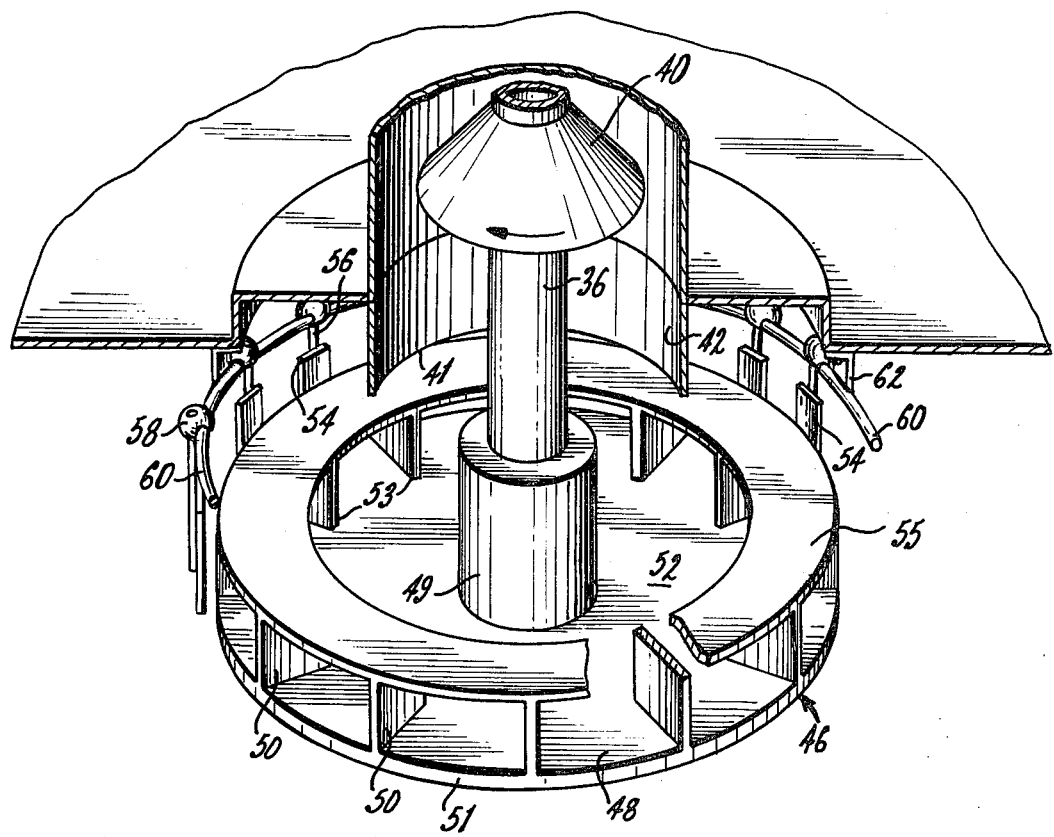
FIG. 2 is a perspective view, portions thereof being in section, and with parts broken away showing the inlet to the rotor and the rotor means of the invention.

In order to maintain maximum beneficial results, the rotor is optionally provided with a cover plate 55 which as best seen in FIG. 2 is disposed on the upper edges of vanes 50. The cover plate has an outer periphery and an inner periphery which is substantially co-extensive with the outer and inner edges of vanes 50 to define an opening substantially co-extensive with central area 52. Bulk material is fed to rotor 46 of the distributor means via the center thereof and propelled by centrifugal force away from the rotor. Advantageously by utilizing the rotor of the instant invention the bulk of materials can be processed without employing material-deflecting stator means as disclosed in the above patent. However, when filling a container of unusual design, e.g. a substantially rectangular container wherein the length is substantially in excess of twice the width, or alternatively if the inlet is not in the approximate center of the container, then the apparatus disclosed herein can, if desired, include such deflector means. Hence bulk material is fed to rotor 46 of the distributor means near the center thereof and propelled by centrifugal force away from the rotor. Modification of the direction of propulsion of the bulk material from the rotor is controlled by the positioning of a plurality of stator blades 54 around the periphery of the rotor 46. The stator blades 54 are secured to shafts 56 which are, in turn, held by gimbal clamps 58. The gimbal clamps 58 are secured to retaining ring 60 which is held through support members 62 to the filling hatch cover or top 44 of container 32.

Electrical level sensing means 64 are provided above the top 44 of container 32 and is shafted through member 66 to rotating sensor vane member 68 which detects the level of bulk material within the container 32. When the pre-set level is attained, sensing means 64 actuates valve 16 through line 70 to stop the stream of bulk material.

Dust collector means 72 are provided in the top 44 of container 32 and serves to collect dust by the venting of gas therethrough.

There are two modes of operation of this system of the invention, both of which will substantially reduce the probability of operator error. Mode One operates when it is desired to load as much material into the container as possible. When material level reaches the position of the level sensor 68, the sensor will automatically cause the pneumatic valve to close, stopping the loading operation. Mode Two provides for the need for a prescribed quantity of material to be loaded into the container. The prescribed amount is programmed into a pre-set batch controller which will then cause the pneumatic valve to close when the integrator unit 24 perceives this desired quantity during the loading operation.

The following Examples will illustrate the present invention. Example I illustrates a conventional apparatus for loading bulk material into a hopper van. Example II illustrates an improvement in loading performance utilizing the improved rotor means of the instant invention without the cover plate Examples II and IV illustrate the performance of the new rotor at high feed rates and Example V illustrates the rotors of Examples III and IV including however the cover plate.

EXAMPLE I

Low density polyethylene granular material of mean particle size 0.035 inches (Range 0.007 inches to 0.1 inches) was loaded into a hopper van. The hopper van was an essentially rectangular bulk material container with two rectangular hopper sections at the bottom. The container measured 8 feet in width by 19'-10" in length by 7'-2" in height plus the two rectangular hopper sections. The overall available volume was 1280 ft$^3$.

In this example, the gravity chute 28 was 8 inches in diameter; the base of the rotating cone 40 was 5 inches in diameter; the outlet of the chute hopper 42 was 7 inches in diameter; the rotor had 6 vertical dividers which measured 12½ inches in diameter having its base inclined outwards and upwards at about 4° to the horizontal; the rotating shaft 36 was 1½ inches in diameter; and the hatch opening 44 of the container was 20½ inches in diameter.

A 5 HP motor was employed to drive the rotor at 1750 RPM. The bulk material was fed at 36,000 lbs/hr. It was found that, for this set of conditions the container was filled to about 89% of the usable container volume. During this run, under high intensity lights, a large fraction of the material could be seen leaving the rotor at points on the rotor vanes before the outer periphery.

EXAMPLE II

The apparatus, granular material and operating conditions of Example I was employed except that a new rotor was substituted for the conventional rotor of Example I. This rotor was 13 inches in diameter with 8 equally spaced vertical dividers extending inward 2¼ inches from the outer periphery. The bulk material was fed at 37,000 lbs/hr. The container was filled to 96% of the available volume. Analysis of the rotor performance using a high intensity strobe showed that under these conditions, virtually all the material left the rotor at the outer periphery.

EXAMPLE III

The apparatus, granular material and operating conditions of Example I was employed except for the following changes: A new rotor was substituted. This rotor was 13 inches in diameter with 8 equally spaced dividers extending inward about 1⅞" from the outer periphery. The outlet of the chute hopper was eight inches. The bulk material was fed at 55,000 lbs/hr.

At this high flow rate it was noted that the bulk material was not thrown as far into the container as at the lower flow rates of Example II.

EXAMPLE IV

The procedure of Example III was repeated except that the rotor had 12 equally spaced dividers extending inward about 1⅞" from the outer periphery of the base member. It was observed that because of the high flow rate and greater quantity of vanes, that a fraction of the resin was being ejected prior to the outer periphery of the vanes with a significant vertical velocity component.

EXAMPLE V

The procedures of Examples III and IV were repeated except that in each case the rotor included an annular cover plate which had a 13 inch outer diameter and an inner diameter co-extensive with the vertical vanes. The cover plate assured that no material was ejected prior to reaching the outer periphery. Subsequent removal and inspection of the cover plate illustrated that wear marks had developed on the bottom surface due to the abrasion of the granular material.

What is claimed is:

1. An improvement in the apparatus for feeding and distributing in a container of varying configuration bulk materials which includes inlet means including a discharge outlet positioned near the top of the container, and rotor means horizontally positioned below said inlet means, whereby said bulk materials are delivered from said inlet means through said discharge outlet into said rotor means the improvement wherein said rotor means includes a rotor having a substantially circular base member, a rotor shaft for providing movement to said rotor, said base member being detachably secured to said rotor shaft, and a system of upright vanes radially distributed on said base member, said vanes extending from the outer periphery of said base member inwardly towards said rotor shaft and terminating at a point at or prior to the periphery of said discharge outlet of said inlet means to define an unobstructed central area between said rotor shaft and the inward edge of said vanes.

2. The improvement according to claim 1 wherein said unobstructed central area around said rotor is at least co-extensive with the discharge area of said inlet feed means.

3. The improvement according to claim 1 wherein said base member includes a central hub detachably secured to said rotor shaft.

4. The improvement according to claim 1 wherein said rotor further includes a cover plate disposed on the upper edges of said vanes.

5. The improvement according to claim 4 wherein said cover plate has an inner periphery substantially co-extensive with the inner vertical edges of said vanes.

6. The improvement according to claim 5 wherein said cover plate defines an opening substantially co-extensive with said unobstructed central area in said rotor.

7. The improvement according to claim 1 wherein said rotor contains from 4 to 12 upright vanes.

8. The improvement according to claim 1 wherein said rotor contains about eight upright vanes.

9. The improvement according to claim 1 wherein said vanes extend about ⅓ the distance between the outer periphery of said base plate to said rotor shaft.

* * * * *